K. GAMMEL.
DIE PRESS.
APPLICATION FILED AUG. 11, 1914. RENEWED SEPT. 14, 1917.
1,305,274.
Patented June 3, 1919.
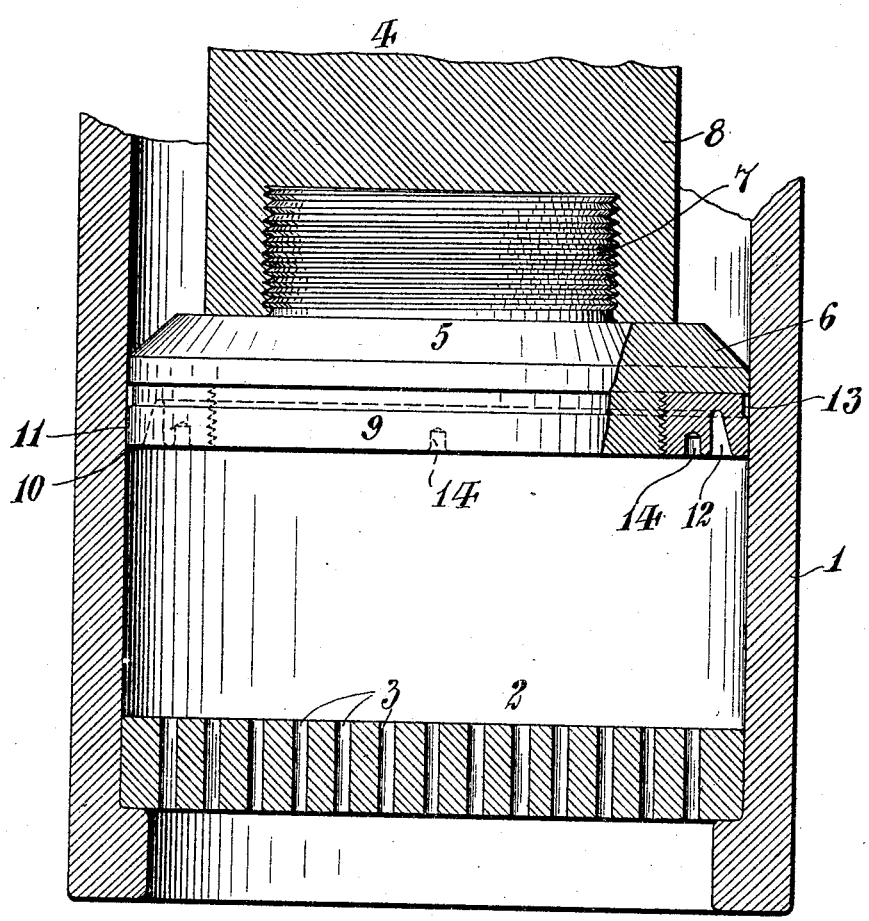
WITNESSES
INVENTOR
Karl Gammel
BY
ATTORNEYS

UNITED STATES PATENT OFFICE.

KARL GAMMEL, OF CLEVELAND, OHIO, ASSIGNOR TO THE CLEVELAND MACARONI COMPANY, OF CLEVELAND, OHIO, A CORPORATION OF OHIO.

DIE-PRESS.

1,305,274.     Specification of Letters Patent.     Patented June 3, 1919.

Application filed August 11, 1914, Serial No. 856,229. Renewed September 14, 1917. Serial No. 191,499.

*To all whom it may concern:*

Be it known that I, KARL GAMMEL, a citizen of the United States, and resident of Cleveland, in the county of Cuyahoga and State of Ohio, have invented certain new and useful Improvements in Die-Presses, of which the following is a specification.

My invention relates in general to improvements in die presses for shaping edible pastes, such as macaroni, spaghetti and similar products, and more particularly relates to a combined plunger and packing for use in devices of this character.

In these presses it is usual to feed the semi-plastic dough into a cylinder having a guide plate at one end and, by means of a tightly fitting plunger acting under heavy pressure, force the dough through the small openings in the die plate. Heretofore it has been impossible to prevent thin shavings of the dough from squeezing through the minute clearance between the outer edge of the plunger and the adjacent wall of the cylinder. The usual piston packings found in such devices, as steam engine cylinders, have been ineffective to prevent the working through of the dough and packing devices which depend for their action upon movable parts quickly become inoperative under the enormous pressures used.

One of the objects of my invention is to provide a solid piston which will have a tight fitting engagement with the cylinder sufficient to prevent the passage of the dough thereabout and which is so designed that the pressure of the same against the wall of the cylinder will increase automatically with the increase of pressure necessary to move the plunger through the cylinder.

I attain this object broadly by providing a plunger the wall, or a portion of the wall of which constitutes in effect an incompressible packing for engagement with the cylinder wall and which is expanded slightly by the resistance offered by the dough to the passage of the plunger whereby the packing is wedged into such tight engagement with the cylinder that the dough cannot pass about the plunger.

Various other objects and advantages of the invention will be in part obvious from an inspection of the accompanying drawings and in part will be more fully set forth in the following particular description of one form of mechanism embodying my invention, and the invention also consists in certain new and novel features of constructions and combination of parts hereinafter set forth and claimed.

In the drawings:

The figure is a vertical sectional view through a macaroni die press showing a preferred embodiment of my invention installed therein and with parts thereof broken away.

In the drawing there is illustrated a portion of a macaroni die press of the hydraulically actuated type, including a heavy metal dough cylinder 1 having a die plate 2 provided with tube forming openings 3 extending therethrough and having a plunger 4 mounted in the cylinder and designed to force the paste through the openings 3 as is usual with devices of this character.

The plunger includes a solid cast steel ram head 5 which comprises a heavy disk 6 having a sliding fit with the wall of the cylinder and an upstanding centrally disposed boss 7 threaded into the end of the plunger rod 8. The working end of the disk, on the side adjacent the die plate, is reduced in diameter and a soft metal ring 9, preferably of copper but which may be made of brass, aluminum or similar metal, is screwed onto this reduced portion. The lower working face of this ring is flush with the lower face of the head 5 and forms a sharp cylindrical scraping edge 10 with the wall 11 thereof, which wall normally has a sliding fit with the wall of the cylinder. The working face of the ring adjacent its outer edge is provided with a relatively deep annular groove 12, the inner wall of which is perpendicular to the working face and the outer wall of which converges inwardly and rounds into the perpendicular wall thereby forming a wedge shape groove adapted to receive the dough which is compressed therein. This groove forms the wall of the ring into a spring band integral with the inner portion of the ring, and, in effect, in one piece with the plunger.

In order to increase the resiliency of the spring band to permit a slight distortion of the wall to fit flush against the cylinder wall, the wall of the ring is provided with a peripheral groove 13 adjacent its upper end. A plurality of recesses 14 are provided in the working face of the ring for the insertion of a suitable tool to screw the same into position.

In operation, it will be understood that the cylinder is filled with the dough paste and the plunger brought into pressing engagement with the dough to forcibly feed the same through the restricted open end by the die plate and is usual with devices of this character. In the press illustrated the piston has a normal working pressure of about 5,000 lbs. per square inch. As the plunger progresses through the cylinder the dough enters the groove 12 and forces the band 11 into tight frictional engagement with the wall of the cylinder and this wedging engagement will naturally increase proportionate to the pressure on the dough so that the greater the tendency of the dough to force itself about the plunger the greater will be the expansive pressure of the packing against the cylinder wall.

This piston is rigid as the term is usually used and it is only under the very high pressures used that the ring 9 is expanded and distorted for a micrometric distance into its variable engagements with the cylinder wall and the almost perfect resiliency of the metal is sufficient to return the packing to its normal position when the pressure thereon is discontinued, thereby permitting the easy withdrawal of the plunger from the cylinder at the end of its actuating stroke. At the end of the operation the dough is removed from the groove before it is hardened as the device works best when the dough in the groove is pliable. The parts may be readily demounted for this cleaning and when worn through usage a new ring may be screwed into place. The device is simple in construction, it being only necessary to accurately mill the wall of the packing ring and to tap the threads on the ring and head so as to provide a firm seat for the ring on the plunger.

As the packing ring is fixed to the plunger and is in fact a portion thereof, there is no wearing action between the ring and the other parts of the plunger and the proper setting of the ring in the cylinder does not depend upon the skill of the operator for its effective action.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a die press for forming edible pastes, the combination with a cylinder having a restricted opening for the paste adjacent one end and a reciprocating plunger adapted to force the paste from said cylinder through said restricted opening, said plunger having a freely sliding fit therein and provided with a working head, of a metal packing ring constituting the outer portion of said head, fixed to the plunger and in frictional tight engagement with the cylinder wall, the working face of said ring being provided with a peripheral groove adapted to receive the paste thereby to expand said member into tight frictional engagement with the cylinder.

2. In a die press for forming edible pastes, the combination with a cylinder having a die plate adjacent one end thereof and a reciprocating plunger adapted to force the paste from said cylinder through said die plate, said plunger having a loose fit therein and provided with a head, of a soft metal and continuous packing ring demountably fixed in position on said head with a portion thereof fixed relative to said head and another portion designed to be distorted by the pressure on the paste into frictional tight engagement with the wall of said cylinder.

3. In a die press for edible pastes, the combination with a dough cylinder and a die plate therein, of a plunger reciprocating in said cylinder and having a solid working head provided with a flat working face having a wedge shaped recess therein adjacent its outer edge and adapted to have the dough forced therein, the outer edge of said head sprung resiliently by said dough in the recess into frictional tight engagement with said cylinder to prevent the passage of the dough about said head.

4. In a die press for forming edible pastes, the combination with a cylinder, a plunger mounted in said cylinder and adapted to force the paste therefrom, said plunger including a disk with the end adapted to engage the paste reduced in diameter, a removable metal packing ring screwed onto the reduced end and having a firm seat thereon, the working face of said ring being provided with an outwardly flared peripheral groove continuously open to the paste in the cylinder and forming a slightly resilient outer wall engaging the wall of the cylinder, said groove adapted to receive the paste thereby to expand the outer wall of said ring into frictional engagement with the cylinder wall with a force dependent upon the resistance of the paste to the passage of the plunger through the cylinder, the outer periphery of said ring being provided with a second peripheral groove adjacent the side engaging the plunger thereby to increase the resiliency of the portion of the ring to the outside of the first named peripheral groove.

5. In a die press for edible pastes, the combination of a dough cylinder, a plunger reciprocating in said cylinder and having a working head provided with a working face having a wedge shaped recess therein adjacent its outer edge, said recess being outlined by straight walls with one wall of said recess inclined at an angle to the axis of the cylinder and facing the open end of the recess, said recess adapted to have the dough forced therein, the outer edge of said head being springy and forced by the dough in the recess into frictional tight engagement with said cylinder to prevent the passage of the dough about said head, the outer periphery of said plunger provided with a groove adjacent the bottom of said recess thereby to reduce the thickness of metal between the recess and outer edge of the cylinder.

Signed at Cleveland in the county of Cuyahoga and State of Ohio this 5th day of August A. D., 1914.

KARL GAMMEL.

Witnesses:
GEO. N. DOBIE,
E. M. HOLMGREN.

Copies of this patent may be obtained for five cents each, by addressing the "Commissioner of Patents, Washington, D. C."